Feb. 9, 1943.  F. BIELITZ  2,310,831
SUPERCHARGER REGULATION
Filed Nov. 25, 1939

Inventor:
FRIEDRICH BIELITZ
BY
ATTORNEYS

Patented Feb. 9, 1943

2,310,831

UNITED STATES PATENT OFFICE 2,310,831

SUPERCHARGER REGULATION

Friedrich Bielitz, Dessau-Ziebigk, Germany; vested in the Alien Property Custodian Application November 25, 1939, Serial No. 306,173
In Germany December 10, 1938

6 Claims. (Cl. 123—119)

This invention relates to the regulation of the pressure of air supplied to the intake manifold of an internal combustion engine, as for an aircraft, from a supercharger. The invention is more particularly directed to the manual control of the air pressures supplied to the engine by the supercharger from pressures below that obtained from the minimum supercharger speed to the maximum pressure available, and to automatic means for maintaining any desired pressure.

Efficient operation of internal combustion engines, and particularly aircraft engines, requires an accurate control of the air pressure supplied to the carburetor of the engine. Because of different engine speeds and different atmospheric conditions, it is necessary to have a control which can be adjusted for a wide variety of conditions. Two methods are known for the regulation of the air pressure supplied by the supercharger to the engine. In the first of these, a throttle valve is inserted into the conduit leading from the supercharger to the engine, and the pressure delivered to the engine depends upon the setting of this valve. The position of the valve can be set manually and automatically maintained at this setting by simple devices responsive to changes of pressure in the engine side of the conduit. In this apparatus, the supercharger is connected directly to the engine and operates at speeds in a fixed ratio to the engine speed.

A second method of regulating the air pressure delivered by the supercharger is to provide a change speed transmission between the engine and the supercharger, so that pressures delivered to the supercharger can be made greater or less independently of the engine speed, depending upon required conditions.

Each of these two methods has advantages and disadvantages. In the first, the advantage is obtained in that the throttle can be set so that the pressure delivered to the engine is less than the pressure produced by the supercharger at its lowest speed. Throttle regulation, however, is disadvantageous in that great losses arise and become greater as the pressure on the engine side of the throttle becomes small relative to the pressure developed at the supercharger as determined by the speed thereof. Such losses do not occur when the speed of the supercharger is varied with respect to the engine as in the second method, but the degree of speed variation cannot be made over a range great enough for efficient engine operation because of practical difficulties in constructing an adequate change speed mechanism, and again, in the second method, pressure in the engine side of the conduit below the minimum delivery pressure of the blower cannot be obtained.

It is an object of the invention to construct an apparatus for regulating the pressure of air delivered to an engine from a supercharger in which the advantages, without the disadvantages, of both the above described methods are obtained.

A further object of the invention is to construct an apparatus for regulating the pressure of air delivered to an engine from a supercharger which includes a throttle regulation of the air delivered by the supercharger to the engine at the minimum speed of the supercharger, and a variable speed transmission regulation of the supercharger at speeds above the minimum speed.

A further object of the invention is to provide an apparatus for regulating the pressure of the air delivered to an engine from a supercharger which automatically controls both a throttle regulation of the air supply to the engine and a change speed regulation of the supercharger in order to maintain a desired constant pressure of the delivered air.

Generally these objects of the invention are obtained by inserting a throttle valve into the conduit delivering air from the compressor to the engine, by providing a change speed transmission system between the supercharger and the drive therefor, and connecting kinematically the throttle valve and change speed mechanism with a pressure responsive member so that the throttle only is actuated at low supercharger speeds in order to obtain delivery pressures at the engine less than the pressure produced at the supercharger, and an increased supercharger speed when the throttle valve is open for obtaining pressures higher than those which could be obtained by a supercharger driven directly by the engine. A manual control is connected to the pressure responsive device for setting the device for any desired pressure.

A means by which the objects of this invention are obtained is more fully described with reference to the accompanying drawing, in which.

Figure 1:
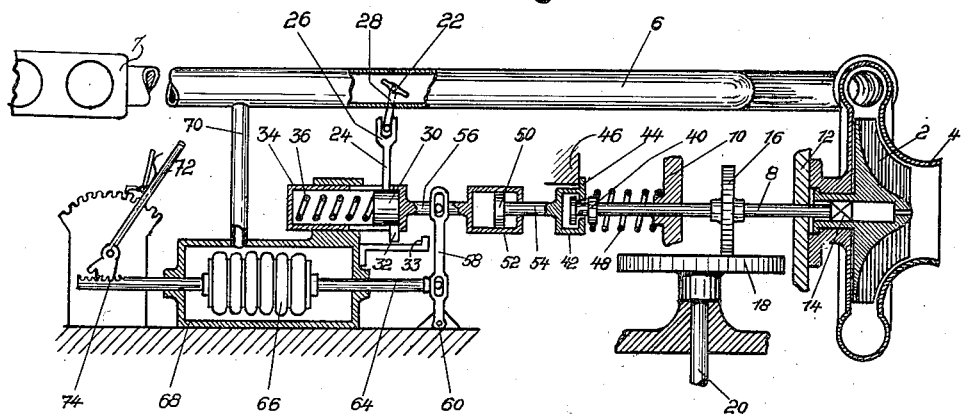
Fig. 1 is a diagrammatic side elevational view, partly in section, showing the connection of the throttle operating means with the change speed operating means, the elements being set for a minimum supercharger speed with partially closed throttle valve.

In Fig. 1, the impeller 2 of the supercharger including housing 4, delivers compressed air through conduit 6 to an engine indicated at 7. The impeller is rotated by shaft 8 mounted in bearings 10 and 12, the forward end 14 of the shaft being slidably keyed in a bore in impeller 2. Wheel 16 fixed to shaft 8 frictionally engages disc 18, the disc being driven through shaft 20 by the engine. As end 14 of shaft 8 is slidably mounted in the supercharger, it is apparent that radial displacement of wheel 16 on disc 18 comprises a change speed transmission between the engine and supercharger. This constitutes one method of changing the delivery pressure of the supercharger with respect to the engine speed.

The means for throttling the air supply delivered through conduit 6 to the engine is obtained by inserting a throttle valve 22 in conduit 6, this valve being operated by a lever 24 having a bifurcated end 26 which engages the crank 28 of valve 22. The lower end of lever 24 engages yoke 30 slidably mounted in cylinder 34, and provided with a depending projection 32 adapted to engage stop 33. It is noted that yoke 30 is urged toward an end of cylinder 34 by a spring 36.

Valve 22 and the change speed transmission 16, 18 are connected together kinematically, and to an automatic regulating means, by a system of levers which include lost motion joints, so that either the throttle or the speed transmission elements are actuated as is necessary. Thus shaft 8 is continued through bearing 10 to terminate in collar 40 which engages housing 42 provided with a flange 44 urged toward a stop 46 by a spring 48. Lost motion element comprising a piston 50 mounted in cylinder 52 connects the speed changing mechanism to the throttle mechanism, piston 50 being connected to housing 42 by shaft 54, while cylinder 52 is connected to cylinder 34 through shaft 56.

A lever 58 pivoted at its lower end 60 is linked at its upper end to pin 62 on shaft 56. Lever 58 is joined by shaft 64 to bellows 66 in cylinder 68. Pipe 70 connects conduit 6 with cylinder 68 so that the air pressure in the conduit on the engine side of throttle 22 is communicated to bellows 66. Manual setting of the bellows is accomplished by lever 72 connected by means of rack 74 to the bellows. The operation of this device is as follows:

In Fig. 1, lever 72 has been manually set in the righthand position so that throttle 22 is substantially closed, and the supply of air to the engine is less than the minimum output of the supercharger 2. In this position of lever 72, the air supply is in accordance with that required for engine operation at ground level, or at low altitudes where the air is relatively dense.

Figure 2:
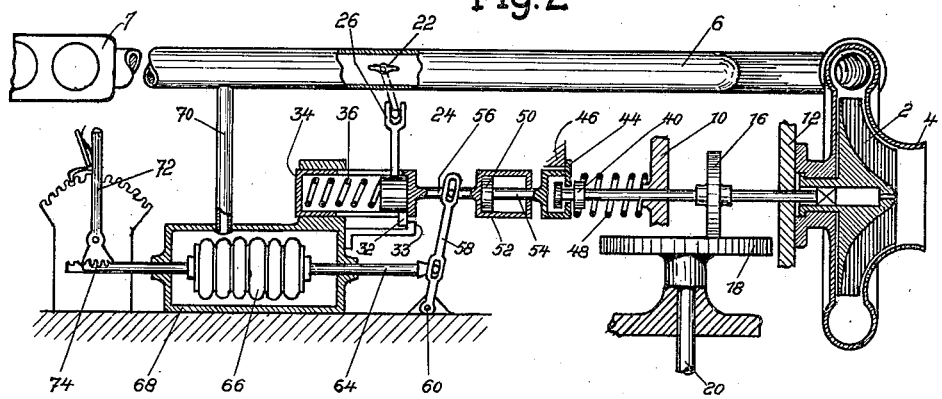
Fig. 2 is a similar view, but showing the elements set with the throttle valve in fully open position, but with the supercharger being driven at minimum speed.

When the aircraft is raised to a higher altitude, and supercharging is necessary, lever 72 is manually moved to center position as shown in Fig. 2. Rack 74, bellows 66, and shaft 64 are thus actuated to angularly move lever 58, and cylinder 34 is moved to the right until projection 32 engages stop 33. Spring 36 urges piston 30 to the right and throttle 22 is set to fully opened position by means of the connecting levers. The movement of shaft 56 by lever 58 has not moved, so far, shaft 54 because of the lost motion joint between shafts 56 and 54. As throttle 22 is open, and as wheel 16 has not been moved relative to disc 18, the full minimum output of the supercharger is now delivered to the engine.

Figure 3:
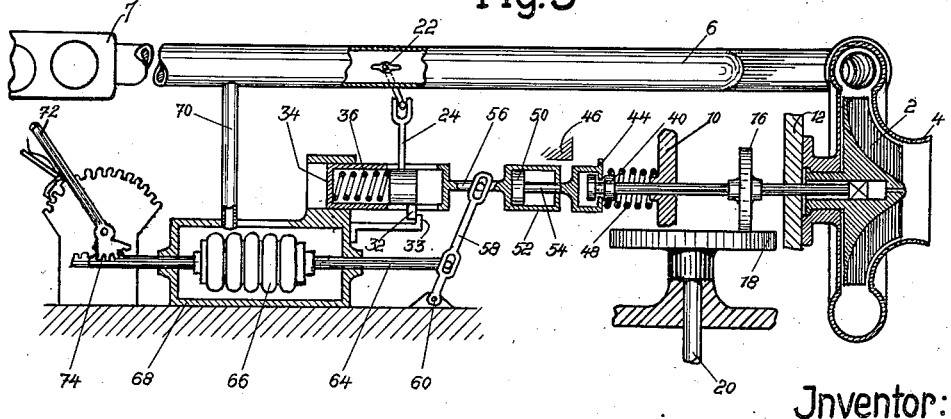
Fig. 3 is a view similar to Fig. 1, but showing the elements set for a fully open throttle valve and an increased supercharger speed.

If now, the aircraft rises to a higher altitude and more supercharging is needed, lever 72 is shifted manually to the lefthand position as shown in Fig. 3. Throttle 22 remains open because of stop 33, but the lost motion in the link between shafts 56 and 54 has been taken up so that wheel 8 has been displaced radially outward on disc 18, and the speed of the impeller 2 increased relative to the speed of disc 18. Consequently the supercharging pressure to the engine is increased.

The bellows 66 is diagrammatically illustrative of a servo-motor device which is employed to maintain an even pressure on the engine side of throttle 22 for any given setting of lever 72. In Fig. 1, should the aircraft go through a low pressure area where the air is less dense, less air would be delivered to the engine and a pressure drop would occur on the engine side of throttle 22. A like drop would take place in cylinder 68 because of connecting conduit 70, and bellows 66 would expand to move shaft 64, whereby throttle 22 would be opened to admit the required amount of air to the engine.

Bellows 66 would similarly function in Figs. 2 and 3. In Fig. 2, for example, upon a decrease in atmospheric pressure, less air would be delivered by impeller 2, and bellows 66 would expand to shift wheel 16 and thus increase the propeller speed, and more air would be delivered to the engine.

For the position of the elements as shown in Fig. 2, an increase in atmospheric pressure would cause an increased pressure in manifold 6, thus collapsing bellows 66 and causing throttle 22 to become partially closed. A similar increase in atmospheric pressure in Fig. 3, would collapse the bellows and cause wheel 8 to be shifted radially inward upon disc 18 to reduce the supercharger speed.

The bellows 66 is also responsive to sudden accelerations of the engine as such accelerations produce a suction in manifold 6, and a resulting pressure drop in cylinder 68, whereupon the bellows expands to actuate the apparatus and give an increased air supply to the engine. A contraction of the bellows to reduce the air supply obviously occurs when the engine decelerates. The bellows 66, or its equivalent in a servo-motor device, is thus desirable in addition to the advantages of giving an evenness of control under normal operations, being more sensitive than and relieving the aircraft pilot from manual operation to take care of small or sudden adjustments, and safeguarding the engine from injury should the pilot not be attentive.

The objects of the invention are thereby achieved. At ground level or low altitudes, less than the minimum supercharger output is delivered to the engine, while at high altitudes the full supercharger output is available. Moreover the apparatus combines the advantages of having the throttle valve 22 operable to produce pressures below that given by the supercharger, and the change speed transmission so that the supercharger can be constructed to operate at high speeds to provide increased pressures. At the same time, both the throttle valve and the change speed transmission are automatically controlled over a wide range from very low to very high pressures so that the air pressure delivered to the engine is maintained at the valve to give the maximum engine efficiency. While certain constructions of the linkage systems and speed transmissions have been described, the invention contemplates similar combinations of other mechanically equivalent elements.

Having now described a means by which the objects of this invention are obtained, what I claim as new and desire to secure by Letters Patent is:

1. A control mechanism for regulating air pressure delivered from a supercharger to an engine comprising throttle means for regulating the flow of air from said supercharger to the engine at pressures below the air pressure produced by said supercharger at its minimum operating speed, change speed transmission means for driving said supercharger, and means for simultaneously actuating said throttle means and said transmission means for throttling the air flow from said supercharger and for changing said transmission means to give the lowest supercharger speed to produce pressures below the air pressure produced by said supercharger at its lowest operating speed, and for opening said throttle means and changing said transmission means to increase said supercharger speed to produce increased air pressures.

2. A control mechanism as in claim 1, said actuating means including a pressure responsive device, means connecting said device with the air pressure on the engine side of said throttling means, and means kinematically connecting said device to said throttling means and said change speed transmission means.

3. A control mechanism as in claim 1, said throttling means comprising a conduit for conducting air from said supercharger to the engine, and a valve mounted in said conduit, and said actuating means comprising a lever, lost motion means connecting said lever to said change speed mechanism, a pressure responsive device, means joining said pressure responsive device to said lost motion means, and an air tube joining said device to said conduit on the engine side of said valve.

4. A control mechanism as in claim 1, said actuating means comprising a pressure responsive device, manual means for setting said device to be responsive to changes from a selected pressure, and means connecting said device to the engine side of said throttling means for responding to changes in pressure thereat.

5. A pressure control apparatus for an internal combustion engine comprising a supercharger, a stepless regulatable drive for said supercharger, a conduit joined to said supercharger for conducting air to said engine, a throttle in said conduit, linkage means between said lever, throttle and stepless drive for opening and closing said throttle upon predetermined movements of said lever without moving said stepless drive from its minimum driving speed position, and for moving said stepless drive to greater than minimum drive position without moving said throttle from open position.

6. An apparatus as in claim 5 further comprising a pressure responsive device interconnecting said lever and said linkage means, and means for making said device responsive to pressures in said conduit on the engine side of said throttle.

FRIEDRICH BIELITZ.